(12) United States Patent
Wekluk

(10) Patent No.: US 7,051,607 B2
(45) Date of Patent: May 30, 2006

(54) ADJUSTABLE MOUNTING DEVICE

(75) Inventor: Raymond A. Wekluk, Blacksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 183 days.

(21) Appl. No.: 10/808,708

(22) Filed: Mar. 18, 2004

(65) Prior Publication Data

US 2005/0204833 A1 Sep. 22, 2005

(51) Int. Cl.
*G01D 21/00* (2006.01)

(52) U.S. Cl. .................................. 73/866.5

(58) Field of Classification Search ............... 248/646, 248/656, 657, 660, 661, 669, 124.1, 125.2, 248/419, 424, 295.11, 298.1, 323, 327, 904; 408/241 G; 33/712, 556; 74/490.13, 479.01, 74/490.09; 73/865.8, 866.5, 661, 419
See application file for complete search history.

(56) References Cited

U.S. PATENT DOCUMENTS

| 238,712 | A | * | 3/1881 | Purinton | 248/657 |
|---|---|---|---|---|---|
| 1,468,087 | A | * | 9/1923 | Smith | 248/661 |
| 1,756,932 | A | * | 5/1930 | Bacher | 474/115 |
| 4,120,210 | A | * | 10/1978 | Sloyan | 474/26 |
| 4,592,146 | A | * | 6/1986 | Campbell | 33/630 |
| 4,592,531 | A | * | 6/1986 | Schihl | 248/646 |
| 4,665,760 | A | * | 5/1987 | Eramo et al. | 73/866.5 |
| 4,819,491 | A | * | 4/1989 | McMurtry | 73/865.8 |
| 5,061,039 | A | * | 10/1991 | Cassidy | 359/894 |
| 6,012,367 | A | | 1/2000 | Westra et al. | 83/147 |
| 6,327,929 | B1 | * | 12/2001 | Yanagisawa | 74/490.09 |

* cited by examiner

*Primary Examiner*—Robert Raevis
(74) *Attorney, Agent, or Firm*—Gerhard W. Thielman, Esq.; Matthew J. Bussan, Esq.

(57) ABSTRACT

An adjustable mounting device comprising: 1) a base having a bottom and opposed orthogonal sides defining a reclining C; 2) a standing C-shaped portion having a bottom leg, a vertical leg and a top leg, the bottom leg lying between the orthogonal opposing sides and positioned by a pair of guide dowels that extend between the orthogonal sides and penetrate the bottom leg and a threaded bolt that penetrates at least one of the opposed orthogonal sides in the direction of the other of the opposed orthogonal sides and engages a threaded aperture in the bottom leg; and 3) a mounting plate suspended from the top leg and above the bottom leg by a threaded bolt that penetrates the top leg and engages a threaded aperture in the mounting plate, a third guide dowel extending from the top leg through the mounting plate, and a mechanism in the mounting plate for retaining an element to be located by the mounting device.

20 Claims, 1 Drawing Sheet

ADJUSTABLE MOUNTING DEVICE

FIELD OF THE INVENTION

The present invention relates to mounting devices for sensors and the like, and more particularly to such devices that provide for two dimensional adjustment and locking during use.

BACKGROUND OF THE INVENTION

In the mounting of various types of sensors such as proximity sensors and the like, there are often situations that require the ability to move or adjust the location of such a device in two dimensions (for example, upwards and downwards, front and back) and to at least temporarily lock the device into a fixed position. While a number of devices are available for similar application, we have found none that met the needs of our particular installation.

Accordingly, there remains a need for a two dimensionally adjustable mounting bracket that, after appropriate adjustment to locate a sensor or the like, will be locked into position for subsequent use.

OBJECT OF THE INVENTION

It is therefore an object of the present invention to provide a two dimensionally adjustable mounting bracket that is fixed, at least temporarily, into position after appropriate adjustment.

SUMMARY OF THE INVENTION

According to the present invention, there is provided an adjustable mounting device comprising: 1) a base having a bottom and opposed orthogonal sides defining a reclining C; 2) a standing C-shaped portion having a bottom leg, a vertical leg and a top leg, the bottom leg lying between the orthogonal opposing sides and positioned by a pair of guide dowels that extend between the orthogonal sides and penetrate the bottom leg and a threaded bolt that penetrates at least one of the opposed orthogonal sides in the direction of the other of the opposed orthogonal sides and engages a threaded aperture in the bottom leg; and 3) a mounting plate suspended from the top leg and above the bottom leg by a threaded bolt that penetrates the top leg and engages a threaded aperture in the mounting plate, a third guide dowel extending from the top leg through the mounting plate, and a mechanism in the mounting plate for retaining an element to be located by the mounting device.

DETAILED DESCRIPTION

Figure 1:
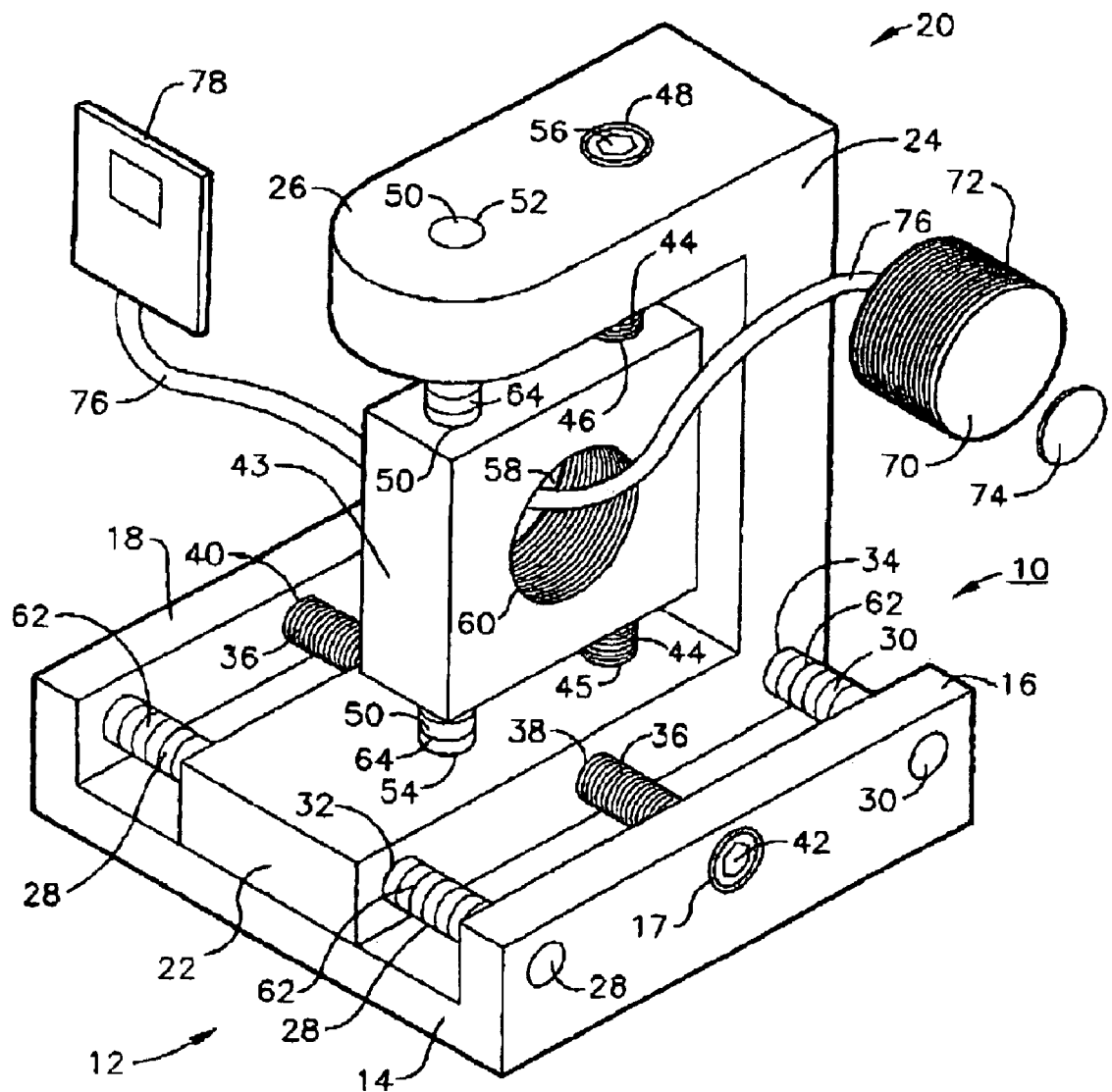
FIG. 1 is a partially disassembled perspective view of the adjustable mounting device and sensor combination of the present invention.

Referring now to FIG. 1 the adjustable mounting device 10 of the present invention comprises a base 12 a bottom 14 and opposed orthogonal sides 16 and 18 that together define a reclining C shape.

The second member of the mounting device of the present invention comprises a second C-shaped member 20 having a bottom leg 22, a vertical leg 24 and a top leg 26 that lies parallel to bottom leg 22. Bottom leg 22 lies moveably between opposed orthogonal sides 16 and 18. First and second guide dowels 28 and 30 extend between opposing orthogonal sides 16 and 18 and pass through bottom leg 22 via apertures 32 and 34 in bottom leg 22. As will be apparent to the skilled artisan, the engagement of first and second guide dowels 28 and 30 with apertures 32 and 34 allows for the free movement of bottom leg 22 along the length of guide dowels 28 and 30. First threaded bolt 36 penetrates at least opposed orthogonal side wall 16 via counter bored aperture 17, passes through bottom leg 22 via a threaded aperture 38 in bottom leg 22 and abuts or preferably penetrates opposing orthogonal side wall 18. According to a preferred embodiment of the present invention, opposing orthogonal side wall 18 includes an aperture 40 in which threaded bolt 36 turns freely and terminates. Cap 42 of first threaded bolt 36 is shown in FIG. 1 as an Allen wrench adjustable head, turns freely in counter bored aperture 17 and allows for the side to side or horizontal adjustment of C-shaped member 20 by the turning of first threaded bolt 36. As will be apparent to the skilled artisan, any number of alternative configurations such as a slotted or Philips head could also be utilized to provide the turning of first threaded bolt 36.

The third member of the mounting device of the present invention comprises a mounting plate 43 that is suspended from top leg 26 by a second threaded bolt 44 that penetrates mounting plate 43 vertically through threaded aperture 46 in mounting plate 43 as well as counter bored aperture 48 in top leg 26. As in the case of the discussion above in connection with threaded bolt 36, it is preferred that second threaded bolt 44 abut or penetrate an unthreaded aperture 45 in bottom leg 22. A third guide dowel 50 affixed in apertures 52 and 54 in top leg 26 and bottom leg 22 respectively, penetrates mounting plate 43 and allows free and guided vertical movement of mounting plate 43 along its length in response to the turning of second threaded bolt 44 through turning of cap 56 which, as in the case of cap 42 of first threaded bolt 36, can be of any number of conventional configurations.

While any number of mechanisms or means may be provided to attach a sensor or other element that is to be oriented to adjustable mounting device 10 through attachment to mounting plate 43, a particularly desirable arrangement for such attachment is shown in FIG. 1 that depicts a sensor 70 in combination with adjustable mounting device 10. According to this embodiment, an aperture 58 is provided in mounting plate 43. Aperture 58 is provided with threads 60 to provide a ready means of attachment of a suitably threaded mating structure, attached to whatever element is sought to be joined with adjustable mounting device 10. In the case depicted in FIG. 1, the element to be connected with mounting plate 43 is a proximity sensor 70 having a threaded end 72 that engages threads 60 when proximity sensor 70 is mounted to mounting plate 43. In this position, proximity sensor 70 can be used to locate the position of a target schematically represented at 74. A cable 76 that, in the case depicted in FIG. 1, connects proximity sensor 70 to an appropriate power source and/or a readout device 78 is also shown.

While not necessary for the operation of the adjustable mounting device 10 of the present invention, position indicating marks 62 and 64 may be provided on guide dowels 28 and 30 and 50 respectively to simplify repositioning of mounting plate 43 and attached sensor 70 in future measurements or locations.

From the foregoing description, it is readily apparent that what has been described is an adjustable mounting device that can be readily adjusted in two dimensions and which after adjustment provides a relatively firm and secure platform for the retention of an element to be positioned in the adjusted or set position.

As the invention has been described, it will be apparent to those skilled in the art that the same may be varied in many ways without departing from the spirit and scope of the invention. Any and all such modifications are intended to be included within the scope of the appended claims.

What is claimed is:

1. An adjustable mounting device comprising:
   A) a base having a bottom and opposed orthogonal sides defining a reclining C;
   B) a standing C-shaped member having a bottom leg, a vertical leg and a top leg parallel to the bottom leg, the bottom leg lying between the opposed orthogonal sides, the standing C-shaped member being positioned by first and second guide dowels and by a first threaded bolt aligned substantially parallel to the first and second dowels, wherein the first and second guide dowels extend between the opposed orthogonal sides and penetrate the bottom leg, and wherein the first threaded bolt penetrates through a first bolt aperture in at least one of the opposed orthogonal sides in and engages a first threaded aperture in the bottom leg; and
   C) a mounting plate suspended from the top leg and above the bottom leg by a second threaded bolt that penetrates the top leg through a second bolt aperture and engages a second thread aperture in the mounting plate, wherein
      a third guide dowel extends substantially perpendicular to the first and second dowels from the top leg through the mounting plate to the bottom leg,
      the second threaded bolt is substantially parallel to the third guide dowel, and
      a mechanism in the mounting plate retains a sensor for locating a target element.

2. The adjustable mounting device of claim 1 wherein the first bolt aperture through at least one of the opposed orthogonal sides is a counter bored aperture in the at least one of the opposed orthogonal sides.

3. The adjustable mounting device of claim 2 wherein the second bolt aperture through the top leg is a counter bored aperture in the top leg.

4. The adjustable mounting device of claim 1 wherein
   the first and second threaded bolts have opposing termini and
   each of the first and second threaded bolts have a turn engagement mechanism for rotating the first and second threaded bolts on at least one of the termini on each of the bolts.

5. The adjustable mounting device of claim 4 wherein
   the first and second bolt apertures in the at least one of the opposed orthogonal sides and the top leg are counter bored respectively, and
   the turn engagement mechanism for rotating each of the first and second threaded bolts each comprises an Allen head recessed in each of the counter bored apertures.

6. The adjustable mounting device of claim 1 wherein said mechanism in the mounting plate comprises a third threaded aperture in the mounting plate, and the sensor includes mating threads that engage the third thread aperture.

7. The adjustable mounting device of claim 1 further including position indicating marks on the first and second guide dowels.

8. An adjustable mounting device comprising:
   A) a base having a bottom and opposed orthogonal sides defining a reclining C;
   B) a standing C-shaped member having a bottom leg, a vertical leg and a top leg parallel to the bottom leg, the bottom leg lying between the opposed orthogonal sides, the standing C-shaped member being positioned by first and second guide dowels and by a first threaded bolt aligned substantially parallel to the first and second dowels, wherein the first and second guide dowels extend between the opposed orthogonal sides and penetrate the bottom leg and, wherein the threaded bolt penetrates at least one of the opposed orthogonal sides through a first counter bored aperture and engages a first threaded aperture in the bottom leg; and
   C) a mounting plate suspended from the top leg and above the bottom leg by a threaded bolt that penetrates the top leg through a second counter bored aperture in the top leg and engages a second threaded aperture in the mounting plate, wherein
      a third guide dowel extends substantially perpendicular to the first and second dowels from the top leg through the mounting plate to the bottom leg,
      a second threaded bolt is substantially parallel to the third guide dowel, and
      a mechanism in the mounting plate retains a sensor for locating a target element.

9. The adjustable mounting device of claim 8 wherein
   said mechanism in the mounting plate comprises a third threaded aperture in the mounting plate, and
   the sensor includes mating threads that engage the third threaded aperture.

10. The adjustable mounting device of claim 8 further including position indicating marks on the first and second guide dowels.

11. An element locating system, comprising:
    A) a sensor to locate a target element; and
    B) an adjustable mounting device comprising:
       i) a base having a bottom and opposed orthogonal sides defining a reclining C;
       ii) a standing C-shaped member having a bottom leg, a vertical leg and a top leg parallel to the bottom leg, the bottom leg lying between the opposed orthogonal sides, the standing C-shaped member being positioned by first and second guide dowels and by a first threaded bolt aligned substantially parallel to the first and second dowels, wherein the first and second guide dowels extend between the opposed orthogonal sides and penetrate the bottom leg, and wherein the first threaded bolt penetrates through a first bolt aperture in at least one of the opposed orthogonal sides and engages a first threaded aperture in the bottom leg; and
       iii) a mounting plate suspended from the top leg and above the bottom leg by a second threaded bolt that penetrates the top leg and engages a second threaded aperture in the mounting plate, wherein
    a third guide dowel extends substantially perpendicular to the first and second dowels from the top leg through the mounting plate to the bottom leg,
    the second threaded bolt is substantially parallel to the third guide dowel,
    a mechanism in the mounting plate retains the sensor, and
    the sensor engages the mechanism in the mounting plate.

12. The system of claim 11 wherein the sensor is a proximity sensor.

13. The system of claim 11 wherein the first bolt aperture through at least one of the opposed orthogonal sides is a counter bored aperture in the at least one of the opposed orthogonal sides.

14. The system of claim 13 wherein the second bolt aperture through the top leg is a counter bored aperture in the top leg.

15. The system of claim 11 wherein
each of the first and second threaded bolts have opposing termini, and
each of the first and second threaded bolts has a turn adjustment mechanism for rotating the first and second threaded bolts on at least one of the termini on each of the bolts.

16. The system of claim 15 wherein
the first and second apertures in the at least one of the opposed orthogonal sides and the top leg respectively are counter bored,
and the turn adjustment mechanism for rotating each of the first and second threaded bolts each comprises an Allen head recessed in each of the counter bored apertures.

17. The system of claim 11 wherein
the turn adjustment mechanism in the mounting plate comprises a third threaded aperture in the mounting plate, and
the sensor includes mating threads that engage the third threaded aperture.

18. The system of claim 11 further including position indicating marks on the guide dowels.

19. An element locating system, comprising:
A) a sensor; and
B) an adjustable mounting device comprising:
 i) a base having a bottom and opposed orthogonal sides defining a reclining C;
 ii) a standing C-shaped member having a bottom leg, a vertical leg and a top leg parallel to the bottom leg, the bottom leg lying between the opposed orthogonal sides, the standing C-shaped member being positioned by first and second guide dowels and by a first threaded bolt aligned substantially parallel to the first and second dowels, wherein the first and second guide dowels extend between the opposed orthogonal sides and penetrate the bottom leg, and the first threaded bolt penetrates at least one of the opposed orthogonal sides through a first counter bored aperture in the at least one opposed orthogonal sides and engages a first threaded aperture in the bottom leg; and
 iii) a mounting plate suspended from the top leg and above the bottom leg by a second threaded bolt that penetrates the top leg through a second counter bored aperture in the top leg and engages a second threaded aperture in the mounting plate, wherein
a third guide dowel extends substantially perpendicular to the first and second dowels from the top leg through a second aperture in the mounting plate to the bottom leg,
the second threaded bolt is substantially parallel to the third guide dowel, and
a mechanism in the mounting plate retains a sensor for locating a target element.

20. The system of claim 19 wherein the sensor is a proximity sensor.

* * * * *